United States Patent
Yoshida et al.

(10) Patent No.: US 10,414,096 B2
(45) Date of Patent: Sep. 17, 2019

(54) MODELED OBJECT DATA-GENERATING DEVICE, MODELED OBJECT DATA-GENERATING PROGRAM, AND MODELED OBJECT

(71) Applicant: Roland DG Corporation, Hamamatsu-shi, Shizuoka (JP)

(72) Inventors: Makoto Yoshida, Hamamatsu (JP); Akira Harada, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 9 days.

(21) Appl. No.: 15/709,698

(22) Filed: Sep. 20, 2017

(65) Prior Publication Data

US 2018/0079141 A1   Mar. 22, 2018

(30) Foreign Application Priority Data

Sep. 21, 2016 (JP) ................................. 2016-184700

(51) Int. Cl.
*B29C 64/40* (2017.01)
*B33Y 50/00* (2015.01)
(Continued)

(52) U.S. Cl.
CPC ............ *B29C 64/40* (2017.08); *B29C 64/386* (2017.08); *B33Y 50/00* (2014.12);
(Continued)

(58) Field of Classification Search
None
See application file for complete search history.

(56) References Cited

U.S. PATENT DOCUMENTS

| 2015/0044318 A1 | 2/2015 | Ohkusa et al. |
| 2016/0133050 A1 | 5/2016 | Sakurai et al. |
| 2017/0136709 A1* | 5/2017 | Sagawa ................. B33Y 30/00 |

FOREIGN PATENT DOCUMENTS

| JP | 2015-033825 A | 2/2015 |
| JP | 2016-088066 A | 5/2016 |

OTHER PUBLICATIONS

Roland DG South Africa, "3D Desktop Printer Brings Your Ideas to Life", http://joh.telpro.co.za/products/3d-milling/arm-10/arm-10-features, Sep. 3, 2014, 2 pages.
(Continued)

*Primary Examiner* — Ryan A Jarrett
(74) *Attorney, Agent, or Firm* — Keating & Bennett, LLP

(57) ABSTRACT

A device generating modeled object data representing a modeled object created while supported by pillar-shaped supports using a 3D printer includes a storage to store data of a body and data of the supports, a layout determiner to determine a layout of the body of the modeled object in a building area of the 3D printer, a display controller to display an image of the body with the determined layout, a support arrangement determiner to determine build positions to create the supports of the modeled object in the determined layout, and a modeled object data generator to generate the modeled object data representing the modeled object in a state where the modeled object is created, each build position to create the support being determined by the support arrangement determiner at a locally highest point parallel to a horizontal plane and protruding thereabove in the vertical direction, the locally highest point being located at a position lower than a top end of the support.

5 Claims, 13 Drawing Sheets

(51) Int. Cl.
*B29C 64/386* (2017.01)
*G05B 19/4099* (2006.01)

(52) U.S. Cl.
CPC .............. *G05B 19/4099* (2013.01); *G05B 2219/35134* (2013.01); *G05B 2219/49007* (2013.01); *G05B 2219/49041* (2013.01); *Y02P 90/265* (2015.11)

(56) References Cited

OTHER PUBLICATIONS

Roland DG Corporation, "ARM-10 User's Manual", http://download.rolanddg.jp/cs/3d/manual/ARM-10_USE_JP_R2.pdf, retrieval date Aug. 25, 2016, 53 pages.

\* cited by examiner

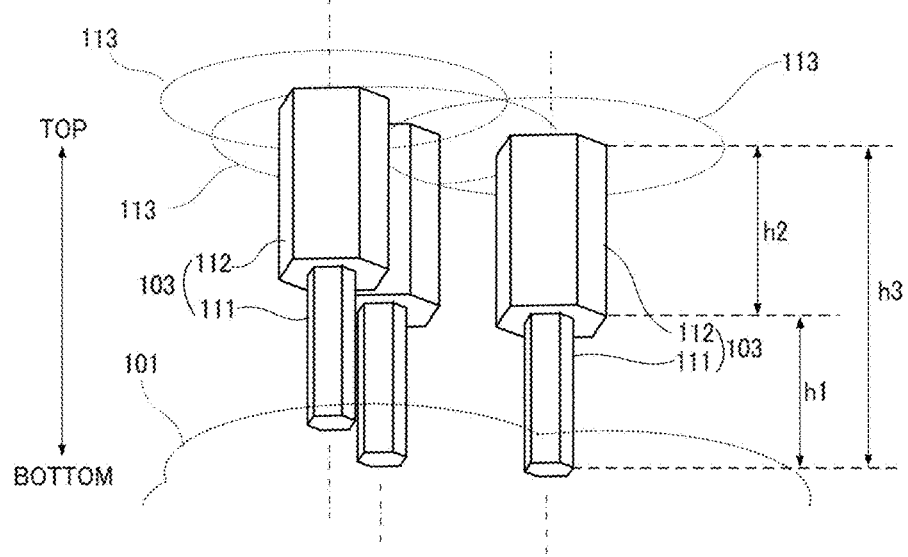
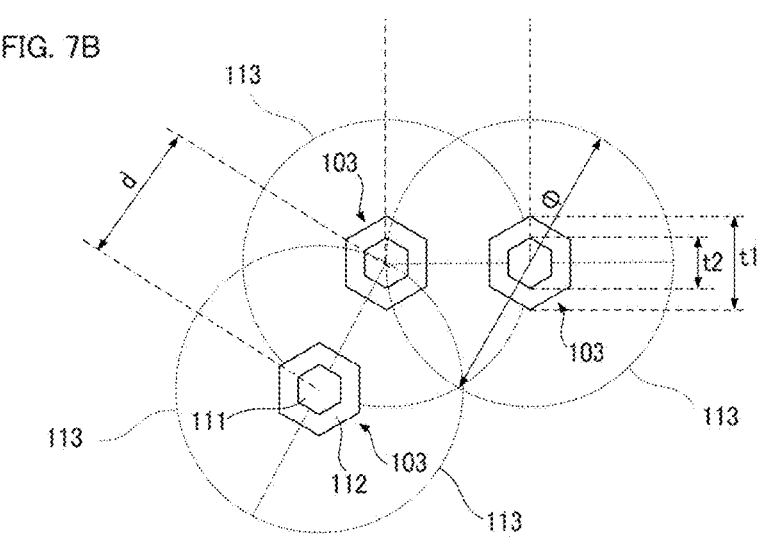

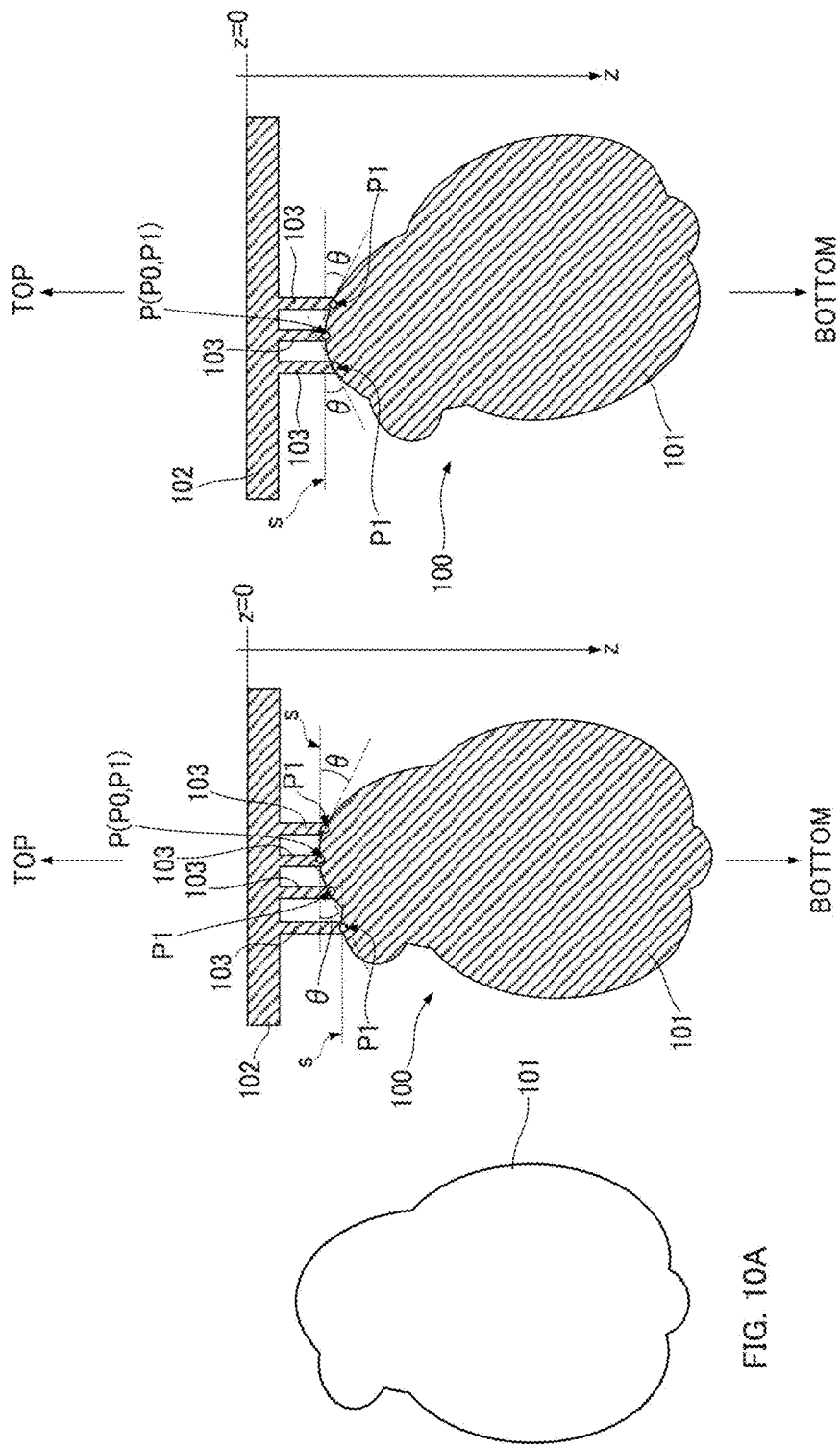

MODELED OBJECT DATA-GENERATING DEVICE, MODELED OBJECT DATA-GENERATING PROGRAM, AND MODELED OBJECT

CROSS REFERENCE TO RELATED APPLICATIONS

This application claims the benefit of priority to Japanese Patent Application No. 2016-184700 filed on Sep. 21, 2016. The entire contents of this application are hereby incorporated herein by reference.

BACKGROUND OF THE INVENTION

1. Field of the Invention

The present invention relates to devices for generating modeled object data representing three-dimensional modeled objects to be created using a 3D printer, programs for making a computer generate modeled object data, and modeled objects.

2. Description of the Related Art 3D printers create a modeled object by creating one flat layer-like three-dimensional object resulting from slicing a three-dimensional modeled object at a predetermined distance into layers, and accumulating such three-dimensional objects in the direction of normal to planes of slice. Examples of 3D printers include a modeling machine described in JP-A-2015-33825 and the 3D printer described in "monoFab ARM-10 Features," [online], [retrieved on Aug. 25, 2016], Roland DG Corporation, available on the Internet at http://www.rolanddg.co.jp/product/3d/3d/arm-10/feature.html. This 3D printer, which is also called a photo-modeling machine, projects light to a photosensitive resin contained in a vat from the bottom to trace an outline perimeter and infill of each cross section and cure the photosensitive resin on the vat floor to a predetermined thickness (about 0.05-0.2 mm). One layer-like three-dimensional object is thus created. Once one layer-like three-dimensional object is complete, it is moved up vertically by one layer height to build the next one layer-like three-dimensional object. In this way, the photo-modeling machine creates a final modeled object by successively creating and accumulating layer-like three-dimensional objects.

Modeled object data from which a modeled object to be created using a 3D printer originates is 3D data representing a three-dimensional shape of a modeled object in a predetermined data format (such as the STL format) and can be generated using a computer system achieved by installing, on a general-purpose computer such as a personal computer (PC), software for generating modeled object data. Examples of the software for generating modeled object data include 3D CAD software, 3D computer graphics software, and 3D CAM software having a function of controlling 3D printers. Modeled object data can also be generated by scanning an original of an object to be created using a 3D scanner.

In the photo-modeling machines described in JP-A-2015-33825 and the "monoFab ARM-10 Features," each modeled object is successively built downward and the final modeled object is suspended. The modeling method in which modeled objects are created by successively curing layer-like three-dimensional objects to accumulate them in the vertical direction while moving up one layer-like three-dimensional object made of a resin cured like a layer is called an "upside-down" or "inverted" modeling. Not limited to photo-modeling machines, upside-down 3D printers use, as a workspace for creating modeled objects, an area beneath a mechanism called a build platform which is movable vertically. The outer bottom surface of the build platform is a build surface parallel to the horizontal plane, and an initial uncured resin is cured contacting on the build surface of the build platform. The modeled object is moved up when the build platform rises.

Modeled objects do not necessarily have a flat top surface with a large area to be contacted with the build surface. The top surface is usually uneven. Accordingly, only the highest portion(s) of the modeled object will contact the build surface. If the contact area is small, the modeled object is suspended from the build surface almost at a single contact point. The modeled object can thus fall by its own weight during the building process.

Accordingly, modeled objects created using an upside-down 3D printer usually have a shape in which a body of a modeled object that is actually intended to be created, is suspended using a plurality of supports. When an operator tries to create a modeled object using an upside-down 3D printer, he or she generates modeled object data representing the modeled object which has supports and a body of the modeled object, using a modeled object data-generating device defined by the computer system described above.

FIG. 1 shows an example of a modeled object 100 integrally created with supports 103. As described above, upside-down 3D printers use, as a work space, an area beneath a build surface 82 of a build platform 81 which is movable vertically. To create the modeled object 100, a rectangular, flat plate-shaped base 102 is created first which covers a horizontally plane of projection of the modeled object 100, and the pillar-shaped supports 103 extending downward are then created on an outer bottom surface 104 of the base 102. When a support 103 reaches the building area for a body 101 of the modeled object, the body 101 begins to be created at the bottom end of that support 103. It should be noted that some 3D CAM software products have a function of automatically generating a support or supports in generating modeled object data. Roland DG Corporation, "ARM-10 User's Manual," [online], [retrieved Aug. 25, 2016], available on the Internet at http://download.rolanddg.jp/cs/3d/manual/ARM-10_USE_JP_R2.pdf describes detailed structures and operations of the 3D printer capable of creating modeled objects using a photosensitive resin as well as functions and instructions to use the 3D CAM software product having a function of automatically generating a support or supports.

When an operator tries to create a modeled object using an upside-down 3D printer, he or she generates modeled object data of a modeled object with supports attached thereto. The supports can be created at desired positions by operating the modeled object data-generating device by the operator or can be created at positions determined using the function of automatically generating a support or supports of, for example, the 3D CAM software described in Roland DG Corporation, "ARM-10 User's Manual."

Functions of automatically generating a support or supports of the software products installed on conventional modeled object data-generating devices are merely simple functions to arrange supports at a predetermined distance. It is hard to say that these functions can arrange supports at ideal locations. If build positions for creating the supports are inappropriate, a portion of a body of the modeled object being created will fall or be deformed downward by its own weight. The aforementioned falling or deformation may also occur when a modeled object being created is weighed downward during the process of pulling up the cured resin due to a property or properties of the resin such as surface tension acting between the cured and uncured resins.

Of course, not limited to upside-down 3D printers, even when a modeled object is created using a 3D printer such as an FDM (registered trademark; Fused Deposition Modeling) 3D printer that creates modeled objects by stacking flat three-dimensional objects on top of each other in a vertical direction, it is necessary to use a support or supports that support(s) the body from vertically underside, depending on the shape of the body. For example, in FDM 3D printers, a build surface is facing to the vertically above. Accordingly, if the vertically outer bottom surface of the body is uneven, the contact between the vertically lowest point of the body and the build surface will be point contact. As the body grows in an FDM 3D printer, the center of gravity of the body may be shifted from the place immediately above that point, tilting the body. It is thus necessary to use a support or supports in order to prevent such tilting.

Accordingly, in order to create modeled objects with high accuracy while preventing defects due to the build process, it is desirable for an operator to manually determine a build position or positions for creating a support or supports using a modeled object data-generating device. An appropriate determination of the build position(s) for creating support(s) requires the operator to have knowledge and experience. It is also necessary that the operator is familiar with the operation of a modeled object data-generating device or devices. In other words, operators who are unfamiliar with the operation of the modeled object data-generating device(s), such as beginners, have troubles in creating, using a 3D printer, modeled objects which are exactly what they intend.

SUMMARY OF THE INVENTION

In view of the above, preferred embodiments of the present invention provide modeled object data-generating devices to automatically determine best positions to create supports for modeled objects to be created using a 3D printer, non-transitory computer readable media including modeled object data-generating programs, and modeled objects with supports formed at the best positions.

A preferred embodiment of the present invention provides a device for generating modeled object data representing a three-dimensional shape of a modeled object, the modeled object being created using a 3D printer by accumulating layer-shaped three-dimensional objects in a vertical direction, each of the layer-shaped three-dimensional objects including a horizontal surface, the modeled object being created with a body supported by a plurality of pillar-shaped supports, the device including: a storage to store data of the body and data of the supports representing three-dimensional shapes of the body and the supports, respectively; a layout determiner to determine, based on the data of the body and operation information input from an input device, a layout in a building area of the 3D printer, the layout including a position and an orientation of the body supported by the supports; a display controller to cause a display to display an image of the body with the layout determined by the layout determiner; a support arrangement determiner to determine, on a surface of the body in the layout determined by the layout determiner, build positions to create the supports; and a modeled object data generator to generate the modeled object data based on the data of the supports, the data of the body, the layout determined by the determiner, and the build positions to create the supports determined by the support arrangement determiner, the modeled object data representing the modeled object to be created by the 3D printer, wherein at least one of the build positions to create the supports is determined by the support arrangement determiner at a locally highest point of a protuberance protruding to an area above the surface of the body in the layout determined by the layout determiner.

According to another preferred embodiment of the present invention, a non-transitory computer-readable medium includes a modeled object data-generating program that causes a computer to execute a method to generate modeled object data representing a three-dimensional shape of a modeled object, the modeled object being created using a 3D printer by accumulating layer-shaped three-dimensional objects in a vertical direction, each of the layer-shaped three-dimensional objects including a horizontal surface, the modeled object being created with a body supported by a plurality of pillar-shaped supports, the method including determining, based on data of the body representing a three-dimensional shape of the body stored in a storage and operation information input from an input device, a layout in a building area of the 3D printer, the layout including a position and an orientation of the body supported by the supports to provide a determined layout; displaying an image of the body on a display with the determined layout; determining, on a surface of the body in the determined layout, build positions to create the supports, to provide determined build positions; and generating the modeled object data based on the data of the body, data of the supports representing three-dimensional shapes of the supports, the determined layout of the body, and the determined build positions to create the supports, the modeled object data representing the modeled object to be created by the 3D printer, wherein at least one of the build positions to create the supports is determined at a locally highest point of a protuberance protruding to an area above the surface of the body in the determined layout.

According to a further preferred embodiment of the present invention, a modeled object made of a resin includes layer-shaped three-dimensional objects, each including a horizontal surface with a normal direction that is parallel to a predetermined direction and is a vertical direction; a plurality of pillar-shaped supports; and a body supported by the supports vertically from above, the supports including upper ends located at a common level from which the supports extend downward, each of the supports being located at a locally highest point on a surface of the body that is parallel or substantially parallel to the horizontal surface and protruding to an area above the horizontal surface in the vertical direction.

According to the modeled object data-generating devices and the non-transitory computer readable media including modeled object data-generating programs of preferred embodiments of the present invention, build positions to create supports of modeled objects to be created using a 3D printer are automatically be determined at the best positions. Regardless of the degree of skill of operators, modeled objects are thus able to be created with high accuracy. Furthermore, the modeled objects according to preferred embodiments of the present invention include supports located at the best positions. Each body being modeled which is supported by the supports is able to be created with high accuracy.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A and 7B show a shape of the supports of the modeled object.

FIGS. 10A-10C schematically show a function of automatically determining a layout of a body of a modeled object by the modeled object data-generating device.

DETAILED DESCRIPTION OF THE PREFERRED EMBODIMENTS

Figure 1:
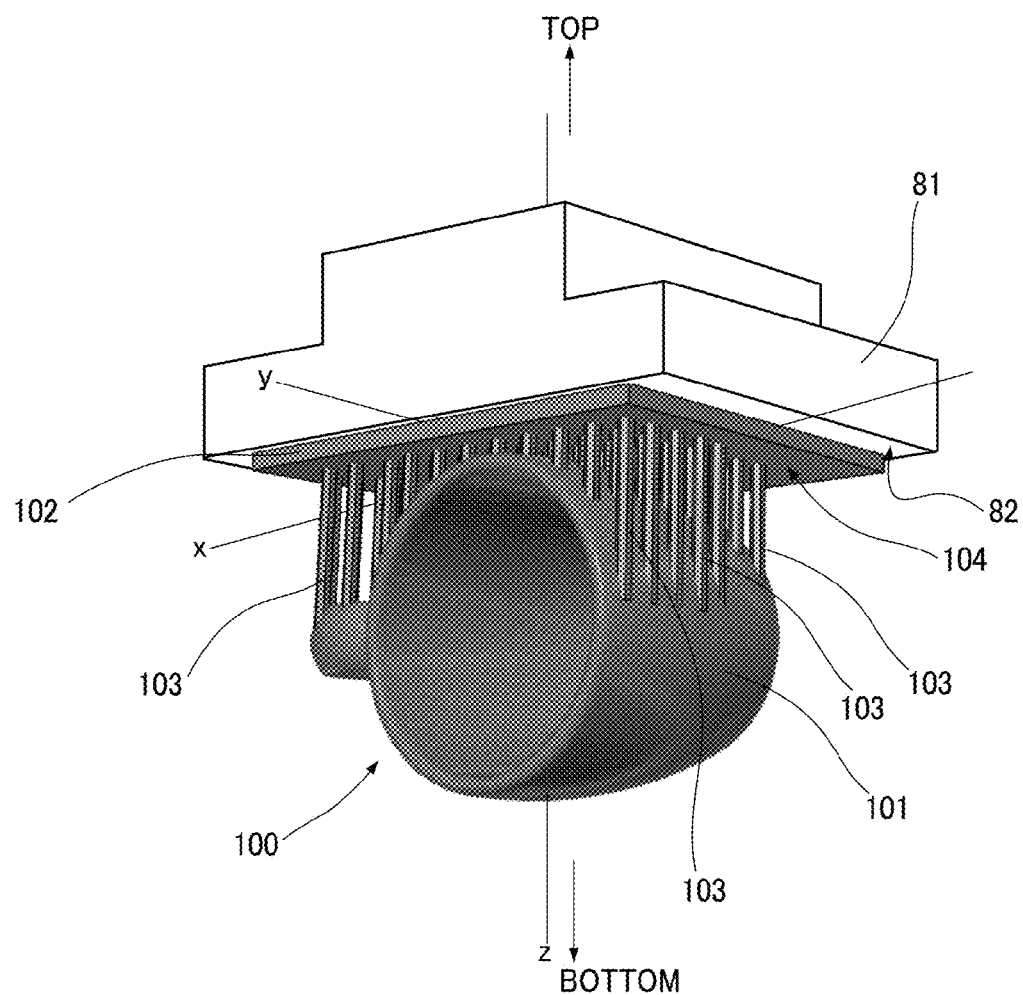
FIG. 1 is a view showing a modeled object created using an upside-down 3D printer.

In addition to the above-described preferred embodiments of the present invention, at least the following preferred embodiments of the present invention will be shown according to the description of the present specification.

That is, modeled object data-generating devices, wherein an area including the locally highest point on the surface of the body is determined as the build position to create the support, wherein the area defines an angle equal to or smaller than a predetermined angle with the horizontal surface will be shown. With these modeled object data-generating devices, deformation of the body due to its own weight is prevented without fail.

Furthermore, the modeled object data-generating devices, wherein the build positions are determined at a predetermined distance in the area defining an angle equal to or smaller than a predetermined angle or the modeled object data-generating device further including a body layout automatic-determiner to automatically determine, based on the data of the body, a layout of the body so that the number of the build positions is the smallest will be shown. According to this modeled object data-generating device, modeled objects are able to be created with high accuracy using as few supports as possible. This facilitates a process of operator's removal of the supports from the modeled object. Furthermore, an effect of reducing the volume of resin material used to create a modeled object is achieved.

Furthermore, the modeled object data-generating devices, wherein the display controller allows the display to display the build position to create the supports so that the build position is able to be recognized on the image of the body, the build position having been determined by the support arrangement determiner will be shown. These modeled object data-generating devices allow an operator to check proper build positions to create supports. Furthermore, the operator is able to recognize a defect of a support before the creation using the modeled object data-generating device further including a support detector to detect, based on the modeled object data generated by the modeled object data generator and the build positions determined by the support arrangement determiner, whether a support is present at each build position, wherein, if no support is present at the build position(s), the image of the body is displayed on the display with the build position(s) without the support(s) being recognizable. This eliminates unnecessary operations of creation.

Preferred embodiments or examples of the present invention will be described below with reference to the attached drawings. In the drawings used in the following description, for the purpose of omitting redundant explanation or facilitating explanation, the same or similar components may be denoted by the same reference numerals. For a component denoted by a reference numeral in a certain figure or figures, the reference numeral may not be used in other figure(s).

A modeled object data-generating device 1 according to a preferred embodiment of the present invention performs processing of generating modeled object data representing, as 3D data in a predetermined format, a 3D modeled object to be created using an upside-down 3D printer. In generating the modeled object data, it automatically determines best build positions to create supports. Regardless of skill of operators, any defects of modeled objects to be created using an upside-down 3D printer are prevented without fail by the support arrangement-determining function to automatically determine the build positions to create the supports at best positions. In the following, a configuration of the modeled object data-generating device 1 and basic information processing in the support arrangement-determining function are described first, and then a specific algorithm of information processing in the support arrangement-determining function is described.

Figure 2:
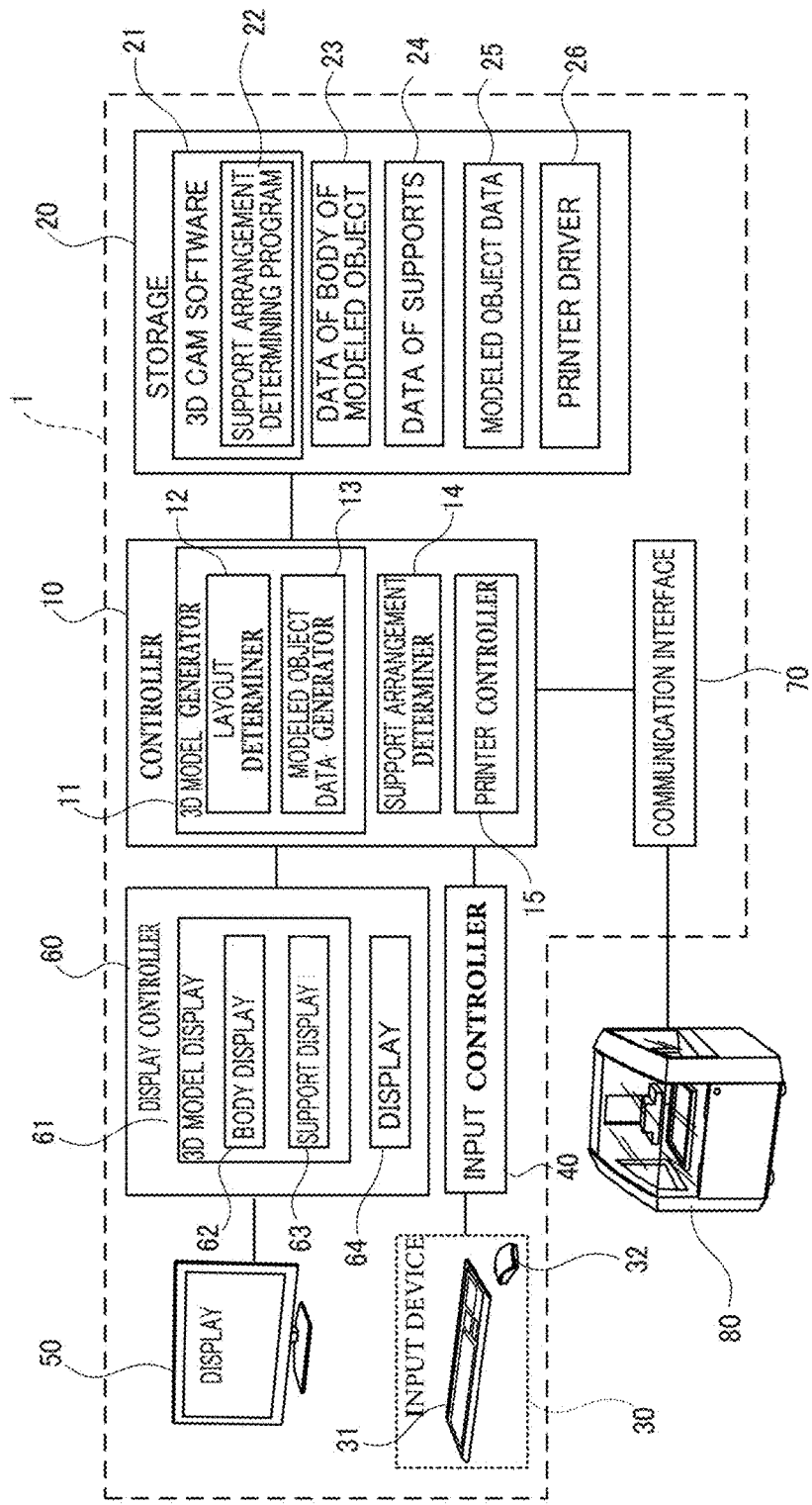
FIG. 2 is a functional block diagram of a modeled object data-generating device according to a preferred embodiment of the present invention.

The hardware for the modeled object data-generating device 1 may be provided by a personal computer. The personal computer defines and functions as the modeled object data-generating device 1 when executing a program that has been installed on it. FIG. 2 shows an exemplified configuration of the modeled object data-generating device 1. In FIG. 2, structures and functions of the modeled object data-generating device 1 are shown in blocks.

The modeled object data-generating device 1 includes a controller 10 including a CPU, a RAM, and a ROM, a storage 20 including an external storage device such as a hard disk drive (HDD), an input device 30 such as a keyboard 31 or a mouse 32, an input controller 40 to transfer, to the controller 10, information corresponding to an operator's input to the input device 30, a display 50, and a display controller 60 that renders 3D model data having data describing, for example, objects (polygon meshes of modeled objects and/or modeled object main bodies) generated by the controller 10, viewpoints to and attitudes of objects, and displays them on the display 50.

The modeled object data-generating device 1 is connected to an upside-down 3D printer 80 via, for example, communication interface (such as a USB) 70. The modeled object data-generating device 1 generates modeled object data of a modeled object created using the upside-down 3D printer 80. The modeled object data-generating device 1 is a computer system that generates modeled object data of modeled objects to be created by an upside-down 3D printer and is not necessarily connected to the 3D printer 80.

The storage 20 stores 3D CAM software 21 to generate modeled object data for the upside-down 3D printer and a printer driver 26 for use in controlling the 3D printer. The support arrangement-determining function is achieved when a support arrangement-determining program 22 included in the 3D CAM software 21 is executed by the controller 10. In other words, the support arrangement-determining function of this preferred embodiment is one function of the 3D CAM software 21.

The storage 20 also stores, as data related to an object, data 23, in a predetermined format, of the body representing a three-dimensional shape of the body and data 24 of the supports representing three-dimensional shapes of the support. Furthermore, the storage 20 stores modeled object data 25 generated by the controller 10 accompanied by executing the 3D CAM software 21.

The controller 10 defines and functions as a 3D model-generator 11 and a support arrangement determiner 14 by executing the 3D CAM software 21. The 3D model-generator 11 generates 3D model data of the modeled object and the body of the modeled object. The support arrangement determiner 14 determines build positions to create supports that support the body.

The 3D model-generator 11 includes a layout determiner 12 and a modeled object data generator 13. The layout determiner 12 determines a layout describing the position and the orientation of the modeled object or the body of the modeled object in a work area of the 3D printer 80. The modeled object data generator 13 generates the modeled object data 25 representing the modeled object on which the supports having the shapes based on the data 24 are arranged at the build positions determined by the support arrangement determiner 14. A printer controller 15 included in the controller 10 controls the 3D printer 80 via a communication interface 70 to create the modeled object based on the modeled object data 25.

The display controller 60 has a VRAM and a predetermined display interface (such as HDMI (registered trademark)). The major functions of the display controller 60 are: to render 3D model data generated in the controller 10, write them into the VRAM in the bitmap format, and display the bitmap images on the display 50. The display controller 60 can be, for example, a dedicated hardware component such as a graphic card. In the configuration shown in FIG. 2, the display controller 60 defines and functions as a 3D model display 61 and a display 64 to provide a screen picture for manipulation, depending on the type of image data from which images to be displayed on the display 50 originate.

The 3D model display 61 displays, on the display 50, images corresponding to the 3D model data generated in the controller 10. The 3D model display 61 includes a body display 62 to display a body of a modeled object with a determined layout and a support display 63 to display the modeled object including the supports and the body with a determined layout. The display 64 displays screen pictures for manipulation of the 3D CAM software 21. The controller 10 provides an operator with a GUI environment via a screen pictures for manipulation displayed on the display 50. Schematically, the display controller 60 displays, on the display 50, the screen pictures for manipulation of the 3D CAM software 21 under the control of the controller 10. In response to an operator's operation information to the input device 30 entered via the input controller 40 to the controller 10, the controller 10 processes various data stored in the storage 20 according to the operation information. The display controller 60 overlays an image corresponding to the processing result in a predetermined area in a screen picture for manipulation displayed on the display 50. For example, the controller 10 determines layouts of the modeled object and the body of the modeled object, depending on operation inputs. The display controller 60 displays, on the display 50, an image of the modeled object or the body of the modeled object represented with that layout. In this way, images reflecting the operation input(s) by the operator are refreshed as appropriate and presented on the display 50.

Figure 3:
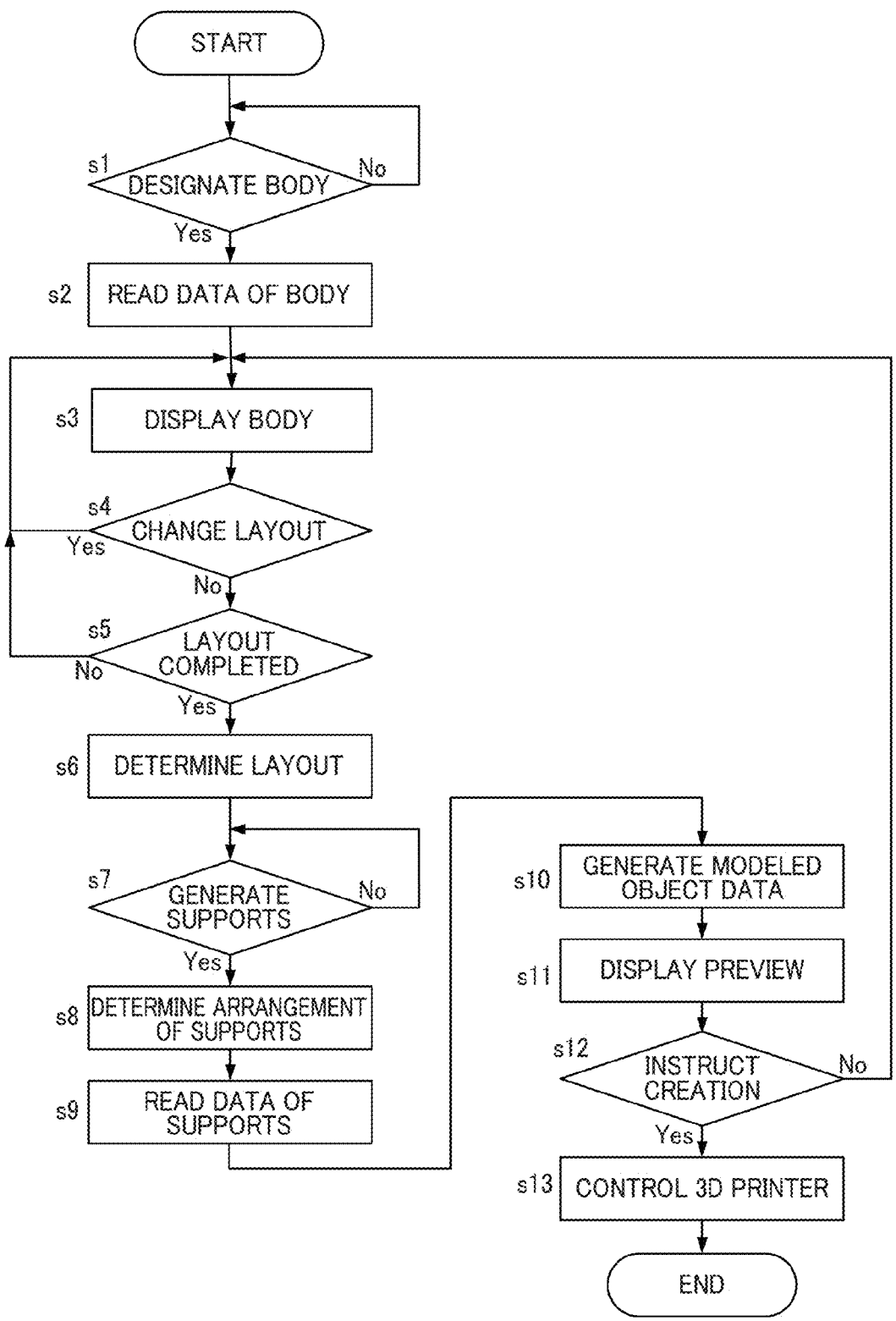
FIG. 3 is a diagram showing a flow of information processing in a support arrangement-determining function of the modeled object data-generating device.

Next, for the support arrangement-determining function of the modeled object data-generating device 1, an outline of the information processing mainly in the controller 10 is described. In this description, it is assumed that the 3D CAM software 21 is running on the PC and the PC defines and functions as the modeled object data-generating device 1. FIG. 3 shows a flow of the information processing in the modeled object data-generating device 1. Referring to FIGS. 2 and 3, information processing related to the support arrangement-determining function is described below.

First, when a body of a modeled object to be created using the 3D printer 80 is designated by an operator's operation input to the input device 30 of the modeled object data-generating device 1, the 3D model-generator 11 reads the data 23 of the body of the designated modeled object from the storage 20 (from s1 to s2), and generates 3D model data of the body based on the data 23. The display controller 60 causes the display 50 to display an image of the body (s3). If an operation is performed by an operator's operation input to change a layout such as the position and the orientation of the body being displayed, the layout determiner 12 changes the layout of the body. The display controller 60 causes the display 50 to display an image of the body with the changed layout (from s4 to s3). When an operation input is performed by the operator to determine the layout of the body, the controller 10 determines the layout of the body (from s4 to s5, and then to s6).

Figure 4A:
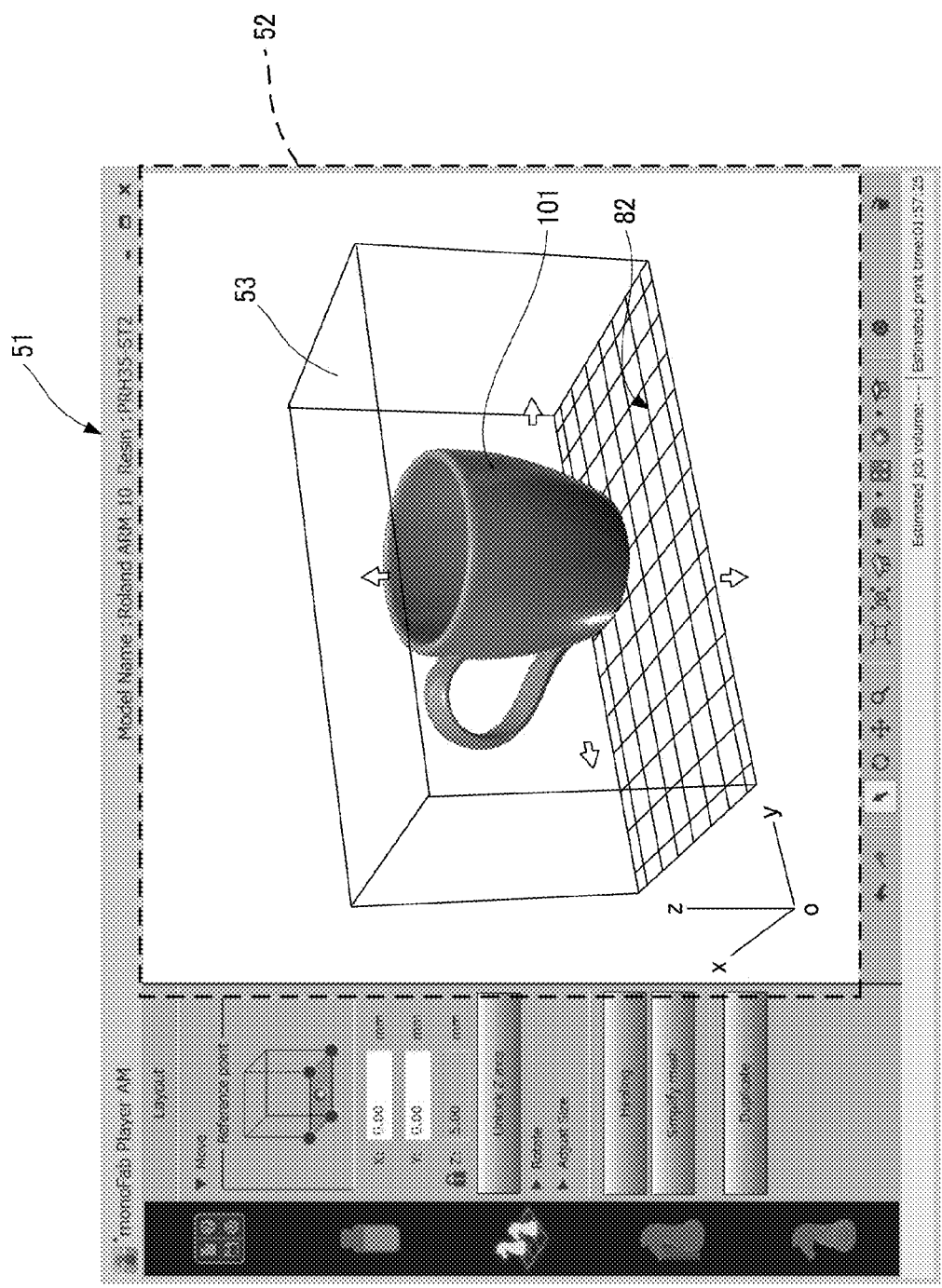
FIGS. 4A and 4B show pictures, displayed on a display device, of a body of a modeled object with a layout determined by a layout determiner of the modeled object data-generating device.
Figure 4B:
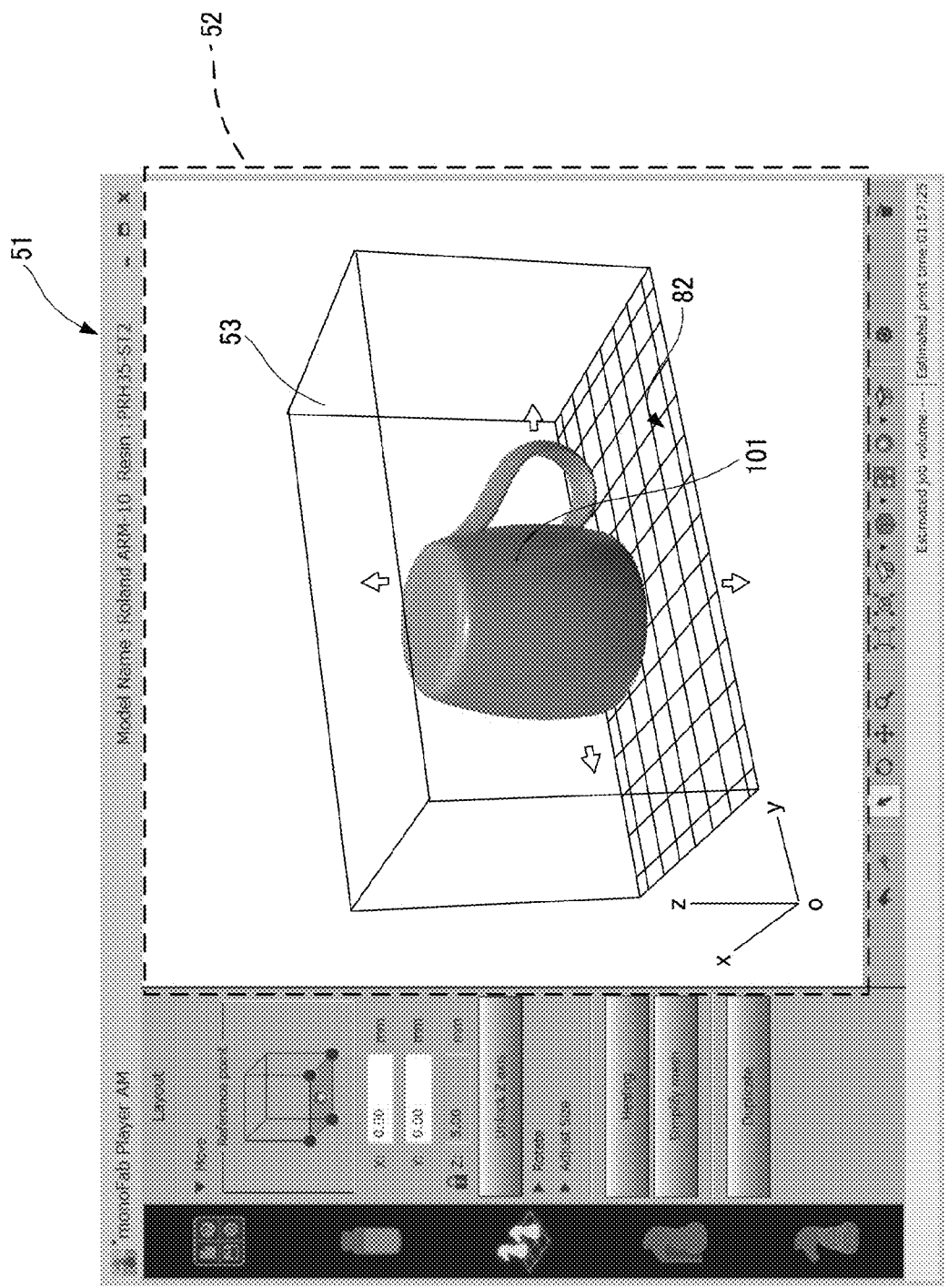

FIGS. 4A and 4B show a transition of pictures displayed on the display 50 in response to the operation to change the layout. As shown in FIG. 4A, a screen picture for manipulation 51 of the 3D CAM software 21 includes an area 52 in which images obtained by visualizing the 3D model data are displayed. With this display area used as the layout area 52, a rectangular parallelepiped area indicating a work area 53 is displayed in the layout area 52. A rectangular area with a grid in the work area 53 represents a build surface 82. A body 101 of a modeled object is displayed in the work area 53 with its initial layout. When an operation input to change the layout of the body is performed, the layout of the body 101 in the layout area 52 is changed as shown in FIG. 4B.

In this preferred embodiment, as shown in FIG. 1, each of the up and down directions is defined so that the direction along which a build platform 81 of the 3D printer 80 moves matches a vertically up and down direction. A build surface 82 is defined as z=0 (i.e., an xy-plane) and a z-axis extends vertically from above to below. The build surface 82 which is parallel to the horizontal plane is a rectangular flat surface with the direction parallel to one of the two sides meeting at right angles in the rectangle being defined as an x-axis direction and the direction parallel to the other being defined as a y-axis direction.

On the other hand, in the layout area 52 in the screen picture for manipulation 51 shown in FIGS. 4A and 4B, the z-axis extends upward. That is, the up-and-down direction of the body 101 displayed on the screen picture for manipulation 51 does not necessarily match the up-and-down direction during the process of creating the modeled object using the 3D printer 80. FIG. 4 shows an image of the body 101 seen from below. The up-and-down direction in the 3D printer 80 is able to be matched with the up-and-down direction of the screen picture for manipulation 51 by changing viewpoints in the work area 53 using an operator's operation input.

With the layout of the body determined, when the operator performs an operation to automatically generate supports, the support arrangement determiner 14 automatically determines build positions to create the supports by processing the 3D model data representing the body with the determined layout (s8). An algorithm of this automatic determination will be described using a specific example.

Figure 5:
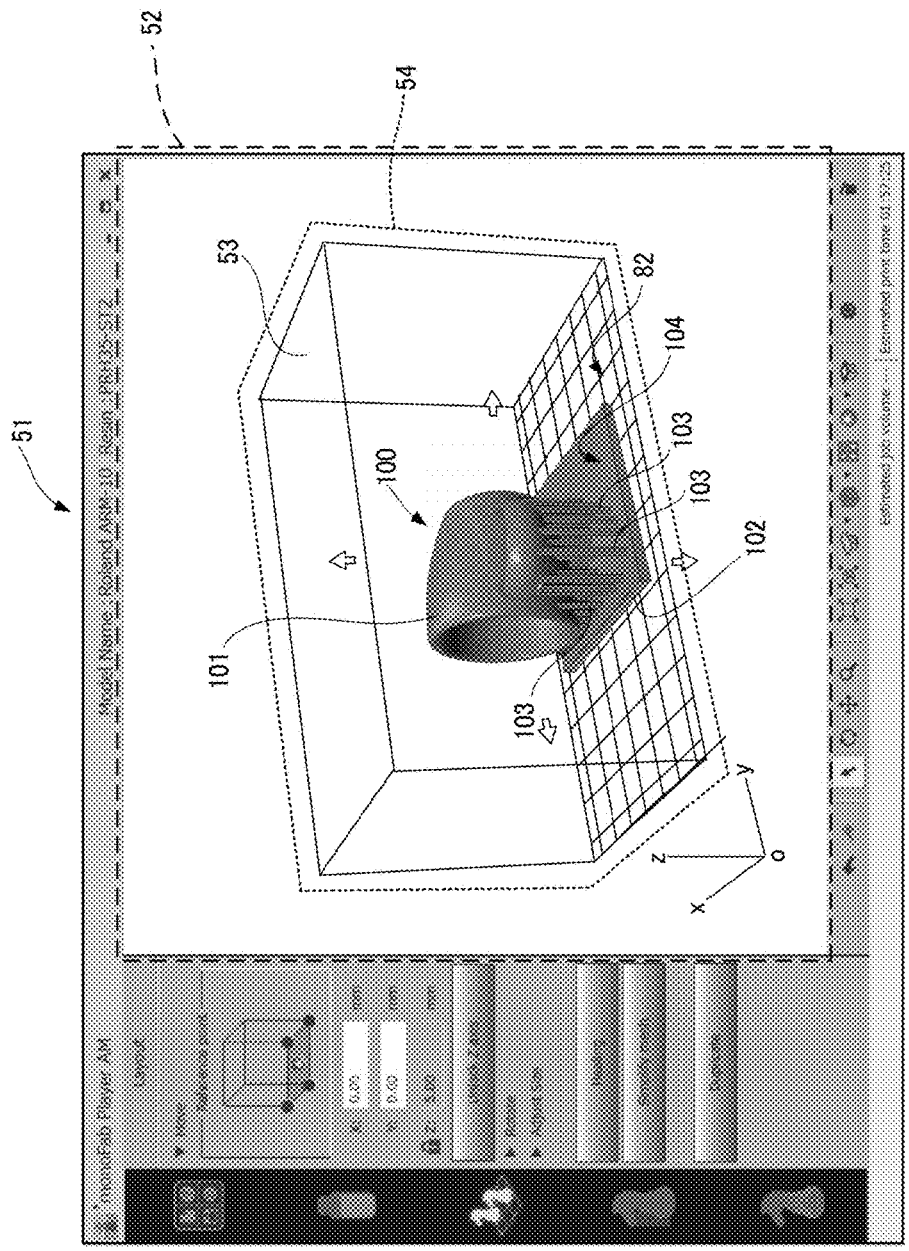
FIG. 5 is a view showing a preview image of a modeled object displayed on the display device.

After the build positions to create the supports are determined, the modeled object data generator 13 reads the data 24 from the storage 20(s9), and generates the modeled object data representing the modeled object to be created using the 3D printer 80, based on the data 24, the 3D model data of the body with the determined layout, and the build positions to create the supports determined at s8 (s10). The controller 10 causes, based on the modeled object data, the display controller 60 to display a preview image that allows the operator to check, for example, the shape of the modeled object in advance (s11). FIG. 5 shows an example of a preview image 54. In the example shown in FIG. 5, in the work area 53 in the layout area 52, an image of the entire modeled object 100 in which a base 102 and supports 103 are added to the body 101 is displayed as the preview image 54. The vertical direction of the preview image 54 does not match the vertical direction of the modeled object to be created using the 3D printer 80.

In response to an operator's operation input to instruct creation of a modeled object, the printer controller 15 controls the 3D printer 80 based on the modeled object data generated in the modeled object data generator 13 to cause the 3D printer 80 to create the modeled object (from s12 to s13). If any problem is found in, for example, the layout when the operator checks the preview image, the process goes back to an appropriate step such as the operation of displaying the initial body again (from s12 to s3).

Next, a specific algorithm of information processing related to a support arrangement-determining function is described.

First Preferred Embodiment

Figure 6A:
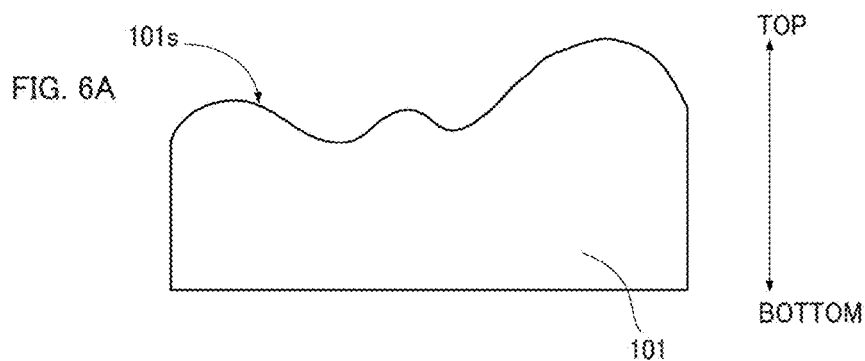
FIGS. 6A-6C show diagrams for describing a support arrangement-determining function according to a first preferred embodiment of the present invention of the modeled object data-generating device.
Figure 6B:
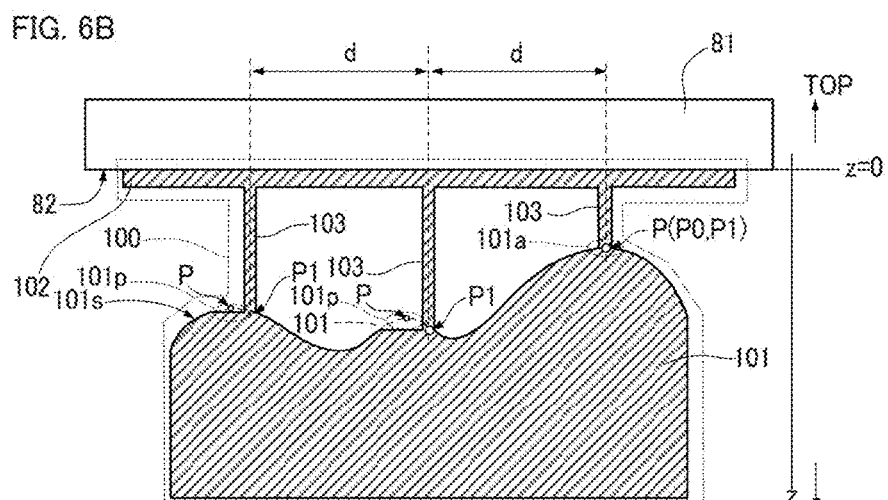
Figure 6C:
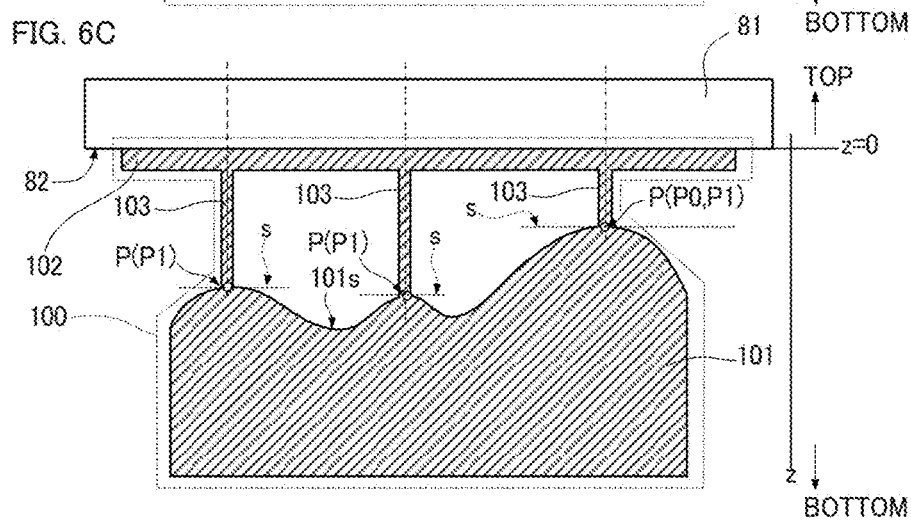

The support arrangement-determining function of a first preferred embodiment of the present invention prevents a defect due to unevenness of a body of a modeled object. FIGS. 6A-6C schematically show the support arrangement-determining function of a first preferred embodiment. In FIGS. 6A-6C, for the purpose of facilitating the description, the shape of the body 101 is simplified and each distance d between the adjacent supports (103-103) is shown enlarged.

FIG. 6A shows the exact shape of the body 101 intended by the operator. In this example, the intended body 101 has an uneven top surface 101s.

FIG. 6B schematically shows defects due to unevenness of the body 101. In the figure, the intended body 101 is depicted by a broken line. When the supports 103 are arranged on the top surface 101s of the body 101 using a function of the conventional 3D CAM software 21 to automatically generate supports 103, a build position P1 to create a support 103 is first formed at the uppermost point of the body 101 (hereinafter, the globally highest point P0). Other supports 103 are formed at a predetermined distance d, based on an area that is able to be supported by a single support 103, from the build position to create the support 103 at the globally highest point P0. If, however, the top surface 101s of the body 101 has a protuberance in a vertical direction and no support 103 is formed at a locally highest point P which is the top of a protuberance that protrudes upward, the surrounding of the locally highest point P of the protuberance 101p is missing. As a result, the modeled object 100 having a shape depicted with hatching in the figure is created. Specifically, although the resin is cured at the positions corresponding to the protuberances 101p during the process of creating the modeled object 100, the cured resin cannot be suspended from above when the build platform 81 moves up because the build position P1 to create the support 103 does not match the locally highest point P. As a result, the area around the locally highest point P is missing. The cured resin of the missing area will, for example, float in the vat of the 3D printer. In particular, when the top surface 101s is uneven with a distance between the adjacent protuberances being smaller than the distance d between the supports 103 and a plurality of the protuberances 101p are created between the supports, the missing area or areas occur(s) near a plurality of locally highest points P, which likely causes a creative problem.

Accordingly, as shown in FIG. 6C, when the locally highest points P of the protuberances 101p match the build positions P1 to create the supports 103, a defect due to unevenness of the body 101 is able to be prevented. As an algorithm that determines the build positions P1 to create the supports 103, on the surface (including the inside of a cavity or cavities) of the body 101 with the determined layout, positions parallel to the horizontal planes s and protruding to the above are detected as the locally highest points P and the coordinates of the locally highest points P are determined as main supporting points at which the supports 103 should be created. Other supports 103 may be created at a predetermined distance d, starting from the determined main supporting points (locally highest points P). The conditions of creating supports, such as the shape of the supports 103 and the distance d, can be determined depending on, for example, a build speed for the modeled object 100 in the 3D printer and properties of the resin.

FIGS. 7A and 7B show an example of conditions of creating supports. Described herein are conditions of creating supports for cases where modeled objects are created using a 3D printer and an ultraviolet curable resin material for 3D printers described in Roland DG Corporation, "monoFab ARM-10 Features" and Roland DG Corporation, "ARM-10 User's Manual." The thickness of a single layer of a modeled object is 0.15 mm, and the build speed is 12 mm/h, for example. FIG. 7A is a perspective view illustrating the shapes of the supports 103 and FIG. 7B is a plan view of the supports 103 seen from the above. As shown in FIG. 7A, each support 103 has a shape of a combination of two hexagonal columns with the lower one being thinner. In this preferred embodiment, each lower thin hexagonal column 112 has a length h1 of h1=2 mm. Lengths h2 of the upper thick hexagonal columns 111 are thus different depending on the total lengths h3 of the supports. As shown in FIG. 7B, each upper hexagonal column 111 has a diagonal distance t1 of 1.4 mm and each lower hexagonal column 112 has a diagonal distance t2 of 1.2 mm, for example. The body 101 can be supported using the supports 103, with each single support 103 supporting an area 113 depicted by a circle having a diameter $\phi$ of 5 mm on the horizontal plane. The modeled object data-generating device 1 determines the distance d between the supports as d=2.5 mm so that the adjacent two supports 103 are both created in the circles having the diameter of $\phi$ of 5 mm without fail. Of course, the area 113 that can be supported using a single support 103 varies depending on the shape(s) of the supports 103, the conditions of creating a modeled object and a resin material used. The conditions of creating the supports 103 are determined previously based on data obtained by computer simulations and/or data based on experiments of creating modeled objects. It should be noted that some 3D CAM software products allow operators to choose dimensions (diagonal distances t1 and t2, and lengths h1 and h2) of the supports. If the dimensions of the supports 103 can be chosen in the modeled object data-generating device 1 according to the preferred embodiment shown in FIG. 2, the conditions of creating the supports 103 may be stored in the storage 20 depending on the combinations of the dimensions. The support arrangement determiner 14 is then able to determine the build positions to create the supports 103 according to the combination of the dimensions chosen by the operator.

Second Preferred Embodiment

In the first preferred embodiment, at least the main supporting points to create the supports are determined and supports other than on the main supporting points are created at a predetermined distance. Of course, only the main support points may be determined as essential support build positions and other build positions may appropriately be determined by an operator. In order to prevent any defects of modeled objects without fail, supports can be arranged densely. On the other hand, a large number of supports arranged densely require a large volume of resin, increasing the material costs. It is thus more preferable that defects of modeled object are prevented without fail using as few supports as possible. With this respect, in a support arrangement-determining function according to a second preferred embodiment of the present invention, defects of modeled objects are prevented without fail by arranging as few supports as possible at best positions.

FIGS. 8A-8F schematically show the support arrangement-determining function according to the second preferred embodiment. FIGS. 8A to 8F show a process of creating a modeled object 100 using a 3D printer. A target, intended body 101 of the modeled object has a shape depicted by dotted lines in the figures. Build positions P1 to create supports 103 are the main supporting points located at locally highest points P including the globally highest point P0 on the body 101 as well as a build position P2 designated by an operator. In the figures, three supports are created: the right support 103 as a first support 103a and second and third supports (103b and 103c) to the left. The first and third supports (103a and 103c) are automatically formed at the main supporting points.

Figures 8A, 8D:
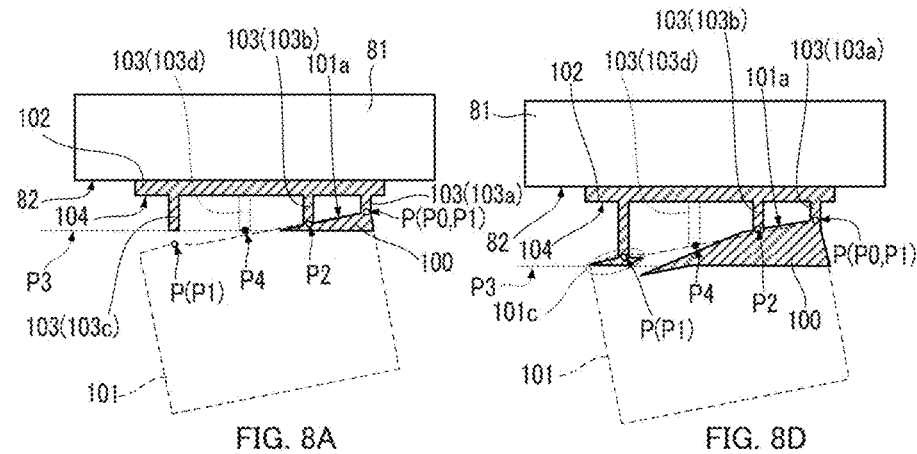
FIGS. 8A-8F show diagrams for schematically describing a support arrangement-determining function according to a second preferred embodiment of the present invention of the modeled object data-generating device.
Figures 8B, 8E:
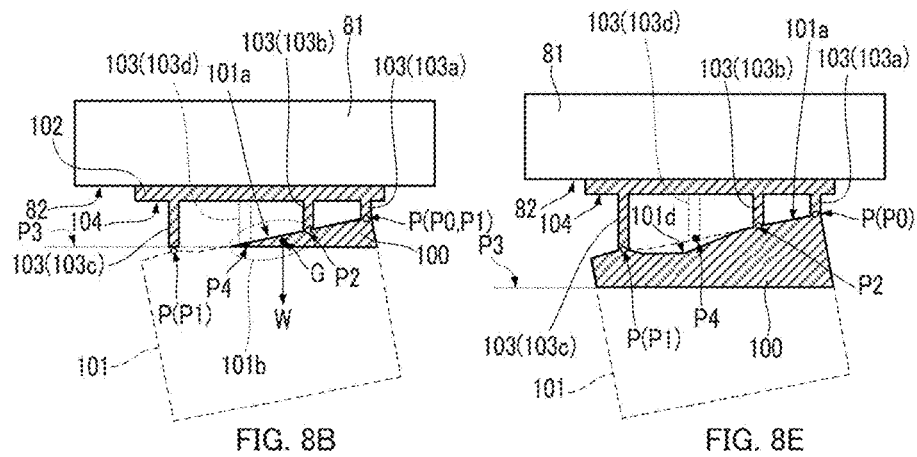
Figures 8C, 8F:
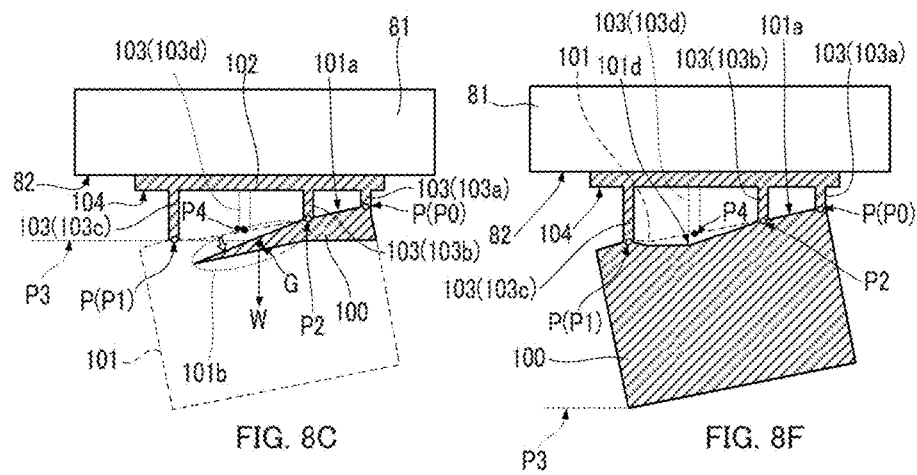

As shown in FIG. 8A, to create the modeled object 100 depicted with hatching, layer-shaped three-dimensional objects are accumulated downward on a build surface 82 of a build platform 81, and a flat plate-shaped base 102 is first formed. Then, the three supports (103a to 103c) are created from an outer bottom surface 104 of the base 102. When a position P3 of the layer being created reaches the position of the globally highest point P0, the body 101 begins to be created from the bottom end of the first support 103a. In a case where the upper end of the body 101 descends gradually from the globally highest point P0, the body 101 begins to be created at a position down a slope 101a where the second support 103b locates which is adjacent to the first support 103a located at the globally highest point P0. When the distance d between the second support 103b that has been connected to the slope 101a that gradually descends and the third support 103c to be connected, as the body 101 is being created, as shown in FIG. 8B, the point P supported by the second support 103b is horizontally away from the center of gravity G of the slope 101a being created. As a result, as shown in FIG. 8C, during the process where the slope 101a is being created toward the third support, a free edge 101b of the slope, the slope 100a can bend downward due to the weight W of the cured resin itself.

The modeled object is kept being created further with the free edge 101b of the slope 101a bent, as shown in FIG. 8D, before the slope 100a created from the first support 103a to the second support 103b is connected to the third support 103c, a portion 101c of the body 101 begins to be created at the bottom end of the third support 103c. As shown in FIG. 8E, when the second support 103b and the third support 103c are connected by the body 101, the slope 101a that has been bent during the process of creation is deformed downward, resulting in the formation of a dent 101d. Then, as shown in FIG. 8F, the final body 101 created has a shape that is different from what the operator was intended. If a support 103d is formed at a position P4 depicted by a black circle in the figure, the bent of the slope 101a and the resultant deformation of the body 101 is prevented.

As described above, in the support arrangement-determining function of the second preferred embodiment, when a body including a top surface with a slope descending gradually is to be created, supports are created at appropriate positions on the slope. If the slope is steep, a single support is able to support the weight of the body because the point supported by the support is not horizontally away from the center of gravity of the slope being created in the body.

Figure 9A:
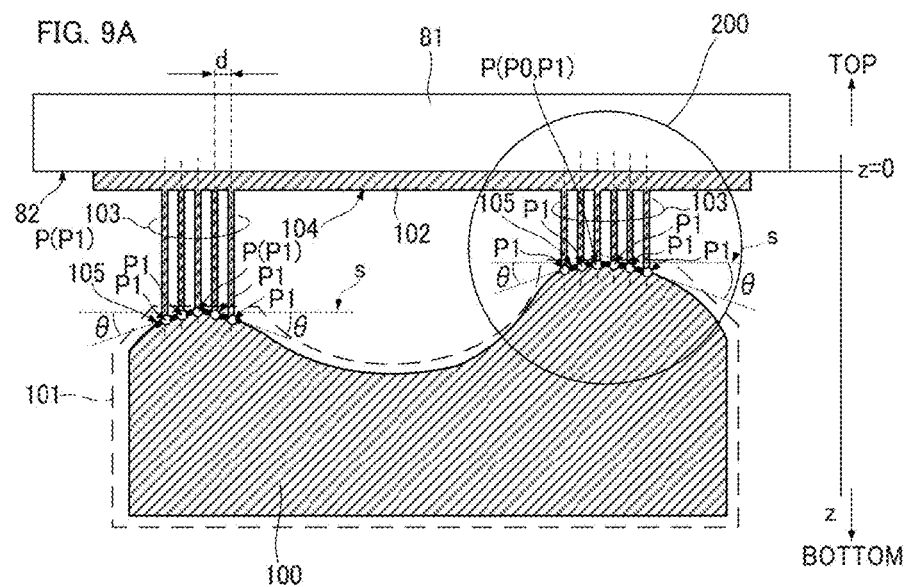
FIGS. 9A and 9B show diagrams of arrangements of the supports determined by the support arrangement-determining function according to the second preferred embodiment of the present invention.
Figure 9B:
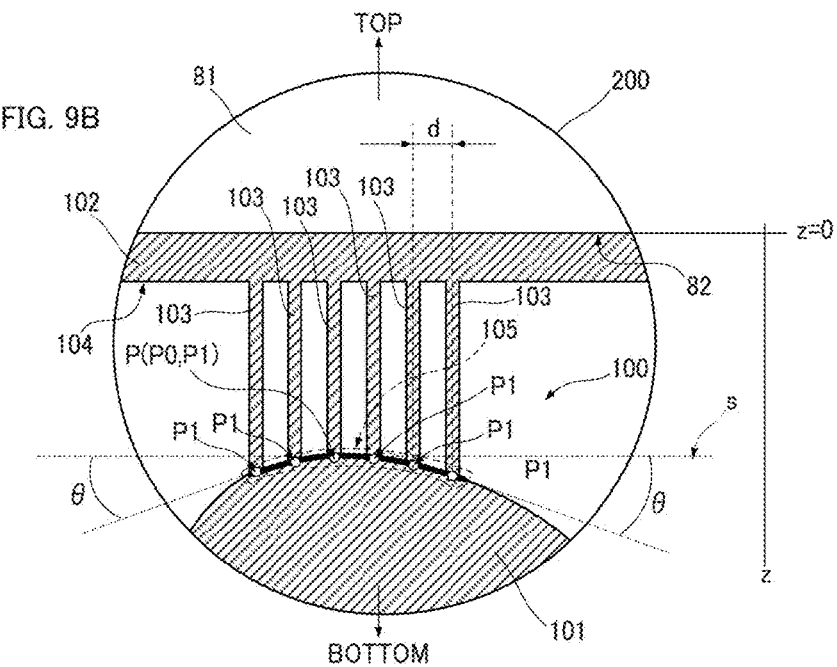

FIGS. 9A and 9B schematically show information processing in the support arrangement-determining function of the second preferred embodiment. FIG. 9A shows a shape of a modeled object 100 created by the support arrangement-determining function of the second preferred embodiment. FIG. 9B shows enlarged details in a circle 200 in FIG. 9A. As shown in FIG. 9A, in the body 101, locally highest points P including the globally highest point P0 are detected as in the first preferred embodiment and the locally highest points P are determined as the build positions P1 to create the supports 103. In the body 101 with the determined layout, an angle of the surface of an area including the locally highest point P is calculated based on, for example, the arrangement of a polygon including the main supporting points P. Then, as shown in the enlarged view of FIG. 9B, an area 105 (depicted by a thick line in the figure) defining an angle of equal to or smaller than $\theta$ with the horizontal plane s is defined as a support arrangement area, and the supports 103 are arranged in the area 105 at a predetermined distance d. This makes it possible to support the body 101 using as few supports 103 as possible and to prevent defects of the body 101. The support arrangement area 105 is an area around each locally highest point P where the angle θ is equal to or smaller than about 20°, for example, provided that the conditions of creating the modeled object and the shapes of the supports are identical to those described in the first preferred embodiment using the 3D printer and the resin for that 3D printer described in Roland DG Corporation "mono-Fab ARM-10 Features" and Roland DG Corporation, "ARM-10 User's Manual." Needless to say, the angle θ of this slope varies depending on the conditions of creating modeled objects and the shapes of the supports.

Other Preferred Embodiments

While the modeled object data-generating devices according to the aforementioned preferred embodiments of the present invention preferably generate the modeled object data for a single type of the upside-down 3D printer, the devices may generate modeled object data for each of different types of upside-down 3D printers. Support data and conditions of creating modeled objects can be stored in the storage by the type of the 3D printer. When a predetermined 3D printer is designated by an operator's operation input, modeled object data can be generated based on the conditions of creating modeled objects and the support data for that printer.

Although the modeled object data generated by the modeled object data-generating devices according to the aforementioned preferred embodiments are assumed to be used in photo-modeling machines, they may be used in 3D printers other than the photo-modeling machines. Furthermore, the modeled object data may be data that causes a 3D printer which is not only an upside-down 3D printer but also, for example, an FDM 3D printer that stacks layer-shaped three-dimensional objects on top of each other in a vertical direction, to create a modeled object. In an FDM 3D printer, a body of a modeled object is created vertically above a support or supports, so that a locally highest point on the body protrudes downward. In this specification, regardless of the absolute up-and-down relation in the vertical direction along the gravity, the relative up-and-down relation is defined for convenience, assuming that the body is supported by the supports from above. In other words, in creating a modeled object while accumulating board-shaped three-dimensional objects in a 3D printer, a relative up-and-down direction is defined, assuming that a direction in which the three-dimensional objects are accumulated is defined as below.

In the modeled object data-generating devices according to the aforementioned preferred embodiments, in the body with the determined layout, the supports are created at all locally highest points including the globally highest point when the globally highest point is away from the outer bottom surface of the base. This means that all of the locally highest points define and function as the main supporting points. If, however, the globally highest point is located at a level on the outer bottom surface of the base, no support is created at the globally highest point, as a matter of course. The modeled object formed using the modeled object data-generating device according to this preferred embodiment includes supports created at least at all locally highest points other than the globally highest point.

In the aforementioned preferred embodiments, each layout of the body is determined according to an operation performed by an operator. The supports, however, should be removed from the body of the modeled object once the modeled object is complete. Accordingly, it is better to use as few support as possible. Of course, the number of the locally highest points may be relatively large and a large volume of resin may be consumed for some layouts in some cases. Accordingly, the modeled object data-generating device may have a function of automatically determining a layout of each body. FIGS. 10A-10C show a concept of information processing to automatically determine layouts. When a body 101 of a modeled object having a shape as shown in FIG. 10A is formed, in automatically determining build positions to create supports, conventional modeled object data-generating devices form supports at equal or substantially equal distances, starting from the globally highest point. The number of supports is able to be reduced to the minimum by arranging a modeled object in such a manner that a projection area becomes the smallest when the main object is seen vertically. The modeled object data-generating device according to this preferred embodiment, however, forms the supports at the locally highest points that define and function as the main supporting points. Accordingly, for the body 101 with the shape as shown in FIG. 10A, the number of the supports 103 created on the body 101 is able to be reduced by inclining the body 101 so that the number of the locally highest points P becomes the smallest as shown in FIG. 10C, rather than with the smallest projection area of the body 101 as shown in FIG. 10B. When the algorithm of the support arrangement-determining function of the first preferred embodiment is used, the number of the supports 103 is able to be reduced to the minimum by allowing automatic determination of the layout of the body so that the number of the locally highest points P is the minimum.

Figure 11:
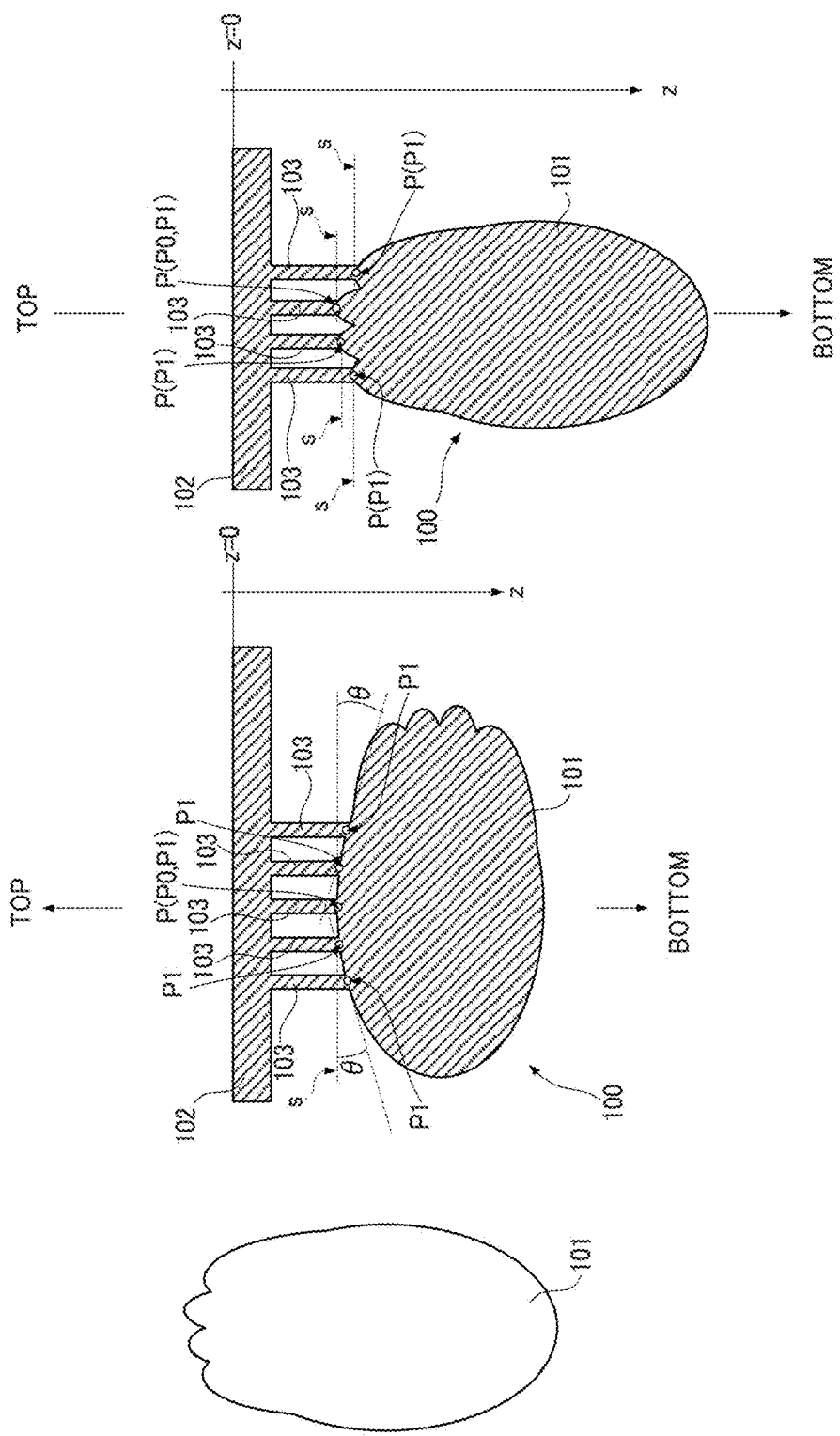
FIG. 11 shows diagrams of an exemplified function of automatically determining a layout of the body of the modeled object.

It should be noted that, in the second preferred embodiment, the number of the supports is not necessarily reduced even when the body is formed and structured so that the number of the locally highest points is the minimum if the surface of the body has complex irregularities as shown in FIG. 11. Anyway, it is more preferable that the arrangement of the body is automatically determined so that the number of the supports is the minimum with each algorithm of the information processing in the support arrangement-determining function. Depending on the size and the layout of the body 101, a modeled object cannot be formed within the work area. In such a case, the best arrangement of the body can be determined as long as the space required for the modeled object falls within the work area.

During the process of automatically determining the build positions to create the supports, it is possible that a support is not generated, due to some processing errors, at a locally highest point in the 3D model data representing a modeled object with the information of its layout. In order to cope with this, for example, the controller adds the coordinates of the locally highest point(s) to the 3D model data of the modeled object when generating the modeled object data. In the 3D model data, it is examined whether data describing the shape of the supports is present at the locally highest points at which the supports should be created. As a result of the examination, if the controller detects a locally highest point or points at which no support is present, it causes the display controller to display, in place of the preview image, the body on the display 50 with the locally highest point(s) without support recognizable.

Figure 12:
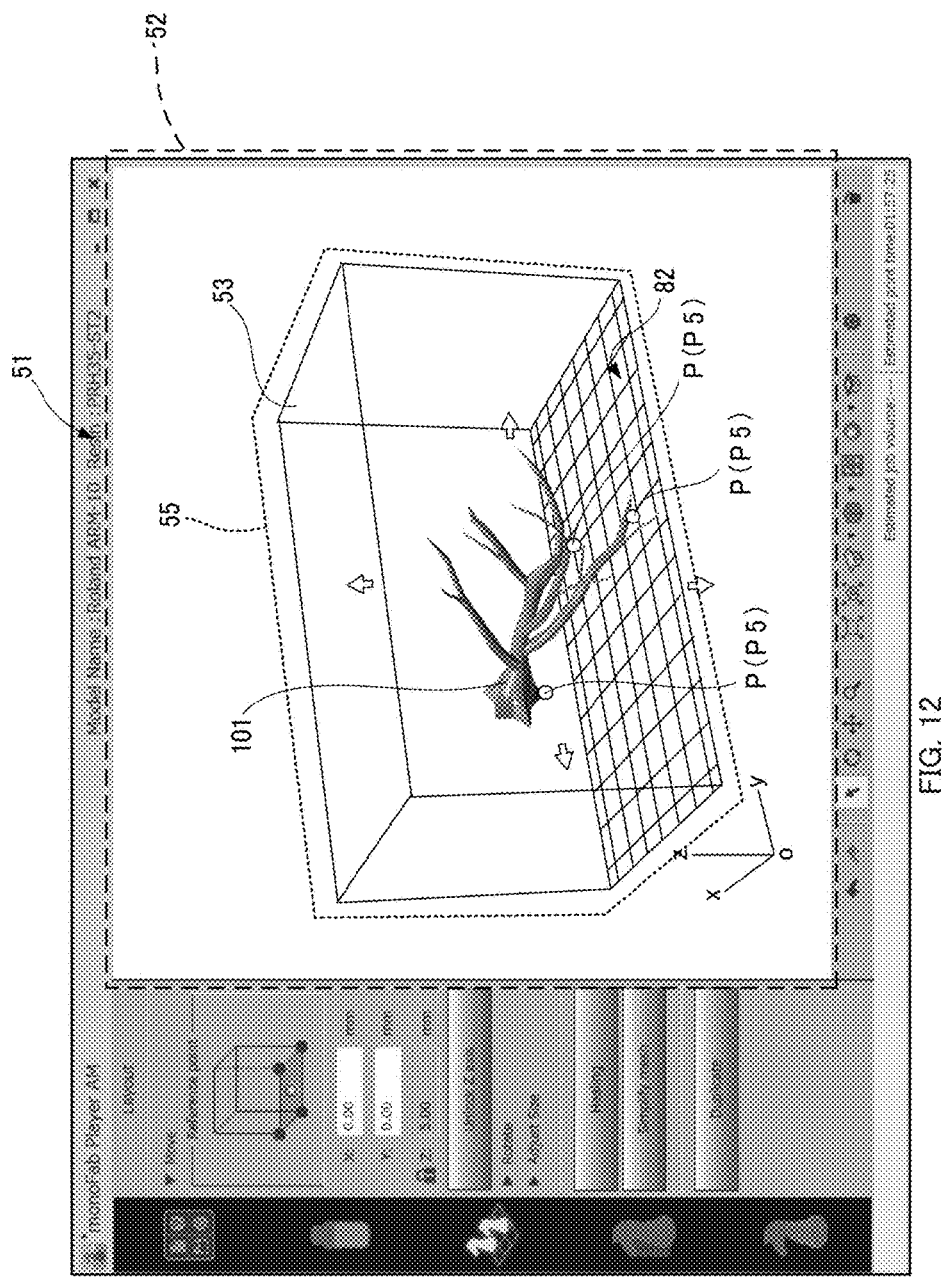
FIG. 12 is a view showing an example of a picture displayed on a display device if an error occurs during a process of determining arrangements of supports or generating modeled object data in the modeled object data-generating device.

FIG. 12 shows an example of the screen picture for manipulation 51 displayed if an error occurs during a process of determining arrangements of supports or generating modeled object data. In this example, as an image 55 in place of the preview image, a body 101 of a modeled object imitating a tree is displayed within the work area 53. White circles indicate locally highest points P5 where no support is provided on the 3D model data of the modeled object in spite of the locally highest point P on the body 101. Once an operator checks the image 55, he or she can operate the modeled object data-generating device to generate the modeled object data again or to arrange manually a support at a locally highest point where no support has been arranged. Not limited to the example shown in FIG. 12, the locally highest point(s) causing an error may be displayed in a recognizable manner on the image of the modeled object including the supports. Alternatively, an area of a predetermined angular range in which supports are to be created in the second preferred embodiment may be displayed in a recognizable manner to allow an operator to recognize the position(s) where no support is provided. Furthermore, not limited to the presence of an error, the main supporting points, i.e., the positions of the locally highest points at which the supports are automatically arranged may be displayed in a recognizable manner. With this, a skilled operator can create a modeled object with high accuracy and more efficiently by, for example, removing an unnecessary support or supports while considering the accuracy of creation of the 3D printer.

Preferred embodiments of the present invention are not limited to using computer systems as described above. They may be programs installed on general-purpose computers such as personal computers. The 3D CAM software having the support arrangement-determining function of the above preferred embodiments may be a preferred embodiment of the present invention. The program may be provided on a portable recording medium (such as DVDs, CDs, USB memory devices, and memory cards) or provided on a website on the Internet in a downloadable manner. Furthermore, modeled objects with supports created at least at locally highest points other than the globally highest point are also preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A modeled object data-generating device for generating modeled object data representing a three-dimensional shape of a modeled object, the modeled object being created using a 3D printer by accumulating layer-shaped three-dimensional objects in a vertical direction, each of the layer-shaped three-dimensional objects including a horizontal surface, the modeled object being created with a body supported by a plurality of pillar-shaped supports, the modeled object data-generating device comprising:
   a storage to store data of the body and data of the supports representing three-dimensional shapes of the body and the supports, respectively;
   a layout determiner to determine, based on the data of the body and operation information input from an input device, a layout in a building area of the 3D printer, the layout including a position and an orientation of the body supported by the supports;
   a display controller to cause a display to display an image of the body with the layout determined by the layout determiner;
   a support arrangement determiner to determine, on a surface of the body in the layout determined by the layout determiner, build positions to create the supports; and
   a modeled object data generator to generate the modeled object data based on the data of the supports, the data of the body, the layout determined by the layout determiner, and the build positions to create the supports determined by the support arrangement determiner, the modeled object data representing the modeled object to be created by the 3D printer; wherein
   at least one of the build positions to create the supports is determined by the support arrangement determiner at a locally highest point of a protuberance that is a part of the body and protrudes to a direction opposite to a direction in which the layer-shaped three-dimensional objects are accumulated in the layout determined by the layout determiner;
   the display controller enables the display to display the at least one of the build positions to create the supports so that the at least one of the build positions to create the supports determined by the support arrangement determiner is able to be recognized on the image of the body;
   the modeled object data-generating device further comprises a support detector to detect, based on the modeled object data generated by the modeled object data generator and the build positions to create the supports determined by the support arrangement determiner, whether one of the supports is present at one of the build positions; and
   if none of the supports is present at one of the build positions, the image of the body is displayed on the display with the one of the build positions without the one of the supports being recognizable.

2. The modeled object data-generating device according to claim 1, wherein an area including the locally highest point on the surface of the body is determined as the at least one of the build positions to create the supports, wherein the area defines an angle equal to or smaller than a predetermined angle with the horizontal surface.

3. The modeled object data-generating device according to claim 2, wherein the build positions are determined at a predetermined distance in the area defining an angle equal to or smaller than the predetermined angle.

4. The modeled object data-generating device according to claim 1, further comprising a body layout automatic determiner to automatically determine, based on the data of the body, the layout so that a number of the build positions is a smallest value.

5. A non-transitory computer readable medium including a modeled object data-generating program that causes a computer to execute a method to generate modeled object data representing a three-dimensional shape of a modeled object, the modeled object being created using a 3D printer by accumulating layer-shaped three-dimensional objects in a vertical direction, each of the layer-shaped three-dimensional objects including a horizontal surface, the modeled object being created with a body supported by a plurality of pillar-shaped supports, the method comprising:
   determining, based on data of the body representing a three-dimensional shape of the body stored in a storage and operation information input from an input device, a layout in a building area of the 3D printer, the layout including a position and an orientation of the body supported by the supports, to provide a determined layout;

displaying an image of the body on a display with the determined layout;

determining, on a surface of the body in the determined layout, build positions to create the supports, to provide determined build positions; and generating the modeled object data based on the data of the body, data of the supports representing three-dimensional shapes of the supports, the determined layout of the body, and the determined build positions to create the supports, the modeled object data representing the modeled object to be created by the 3D printer; wherein at least one of the build positions to create the supports is determined at a locally highest point of a protuberance that is a part of the body and protrudes to a direction opposite to a direction in which the layer-shaped three-dimensional objects are accumulated in the determined layout;

the displaying enables the display to display the at least one of the build positions to create the supports so that the at least one of the build positions to create the supports is able to be recognized on the image of the body;

the method further includes detecting, based on the modeled object data and the build positions to create the supports, whether one of the supports is present at one of the build positions; and if none of the supports is present at one of the build positions, the image of the body is displayed on the display with the one of the build positions without the one of the supports being recognizable.

* * * * *